United States Patent [19]
Gernhardt

[11] 4,007,852
[45] Feb. 15, 1977

[54] KNOCKOUT WINDOW MEANS

[75] Inventor: Paul D. Gernhardt, Newton, Kans.

[73] Assignee: Slater Electric Inc., New York, N.Y.

[22] Filed: Oct. 20, 1975

[21] Appl. No.: 624,043

[52] U.S. Cl. .............................. 220/3.2; 220/266
[51] Int. Cl.$^2$ ...................................... H02G 3/12
[58] Field of Search .................... 220/3.2–3.94, 220/265, 266, 284; 174/51, 53, 58, 60, 64, 65 R

[56] References Cited
UNITED STATES PATENTS

| | | | |
|---|---|---|---|
| 2,959,633 | 11/1960 | Palmer et al. | 220/3.2 X |
| 3,438,534 | 4/1969 | Zerwes | 220/266 X |
| 3,770,873 | 11/1973 | Brown | 174/58 |
| 3,773,968 | 11/1973 | Copp | 220/266 X |
| 3,863,021 | 1/1975 | Schindler et al. | 220/266 X |
| 3,873,759 | 3/1975 | Schindler et al. | 174/65 R |
| 3,895,732 | 7/1975 | Robinson et al. | 220/284 X |
| 3,917,101 | 11/1975 | Ware | 220/266 X |
| 3,926,330 | 12/1975 | Deming et al. | 220/266 X |

Primary Examiner—William Price
Assistant Examiner—Stephen Marcus
Attorney, Agent, or Firm—Morgan, Finnegan, Pine, Foley & Lee

[57] ABSTRACT

Knockout window means include a knockout port formed primarily in a sidewall of an electrical assembly box and a knock-out panel superposed over the knock-out port from the inside of the sidewall. The knockout panel is attached only at its front and back ends to the box, the front end being connected to the inside surface of the sidewall and the back end being connected to the backwall, each by a frangible web which provides doubly accessible panel removal slot means between each end of the knock-out panel and the structure to which each is attached. The panel removal slot means are accessible from both the outside and the inside of the assembly box at each end of the knockout panel, and include four pairs of bearing surfaces against which a wedge-like tool may bear for applying twisting leverage to fracture the webs. Abutment means may be formed on the inside surface of the backwall, and the frangible web thereat may be formed generally continuous with the inside of the backwall to provide panel removal slot means of relatively enlarged depth at back end of the knockout panel. The electrical assembly box, knockout panels and frangible webs may be integrally molded in a unitary structure.

13 Claims, 8 Drawing Figures

KNOCKOUT WINDOW MEANS

BACKGROUND AND OBJECTS OF INVENTION

The present invention relates generally to knockout window structures for electrical assembly boxes and more particularly to integrally molded knockout window structures for electrical assembly boxes made from a moldable plastic material.

Electrical assembly boxes, such as electrical outlet boxes, electrical junction boxes, fuse boxes and other electrical appliance enclosures are usually mounted in walls or ceilings with their front face generally flush with the wall or ceiling for supporting an electrical receptacle, switch or other device which is to be electrically coupled to the circuitry of the room. Electrical conductors are therefore run into the box through apertures formed therein, for coupling the device to such circuitry. However, in order to prevent construction related debris from inadvertently falling into the box before insertion of the electrical cable, and to protect the apparatus mounted therein from the introduction of debris through apertures which are not utilized, even after installation, knockout window structures have been provided in the walls of the structure to cover or close such apertures until the conductors are to be installed.

Some typical electrical assembly boxes consist of die cast metallic housings or molded plastic housings provided with knockout panels which must be removed through the application of a substantial impact or force from the outside. Other structures include knockout window means which are usually accessible from either only the inside or only the outside, and/or which include just one structural member accommodating insertion of a panel removal tool. Thus, once a portion of the panel is broken away from such box structure, the panel usually remains hinged thereto so that complete removal of the panel may be achieved only after additional awkward manipulations, either with tools or by hand. No known knockout window structure has been disclosed which includes removal means for effecting complete removal of the panel in a simple and convenient operation, and for enabling complete removal of the panel from both the inside and the outside of the electrical assembly box.

It is therefore an object of the present invention to provide a new and improved knockout window structure.

Another object of the present invention is to provide a new and improved knockout window structure integrally molded in a unitary electrical assembly box made of moldable plastic material.

It is also an object of the present invention to provide a new and improved knockout window structure in which the knockout panel may be completely removed by convenient means.

It is a further an object of the present invention to provide a new and improved knockout window structure in which the knockout panel may be removed from both the inside and the outside of the assembly structure.

It is still another object of the present invention to provide a new and improved knockout window structure in which the knockout panel may be completely and easily removed yet is connected to the electrical assembly box with sufficient structural integrity to withstand falling debris and other impact during installation of the box.

Objects and advantages of the invention are set forth in part herein and in part will be appreciated herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the knockout window structure of the present invention comprises a knockout port, formed primarily in a sidewall of an electrical assembly box, and a knockout panel to seal off the knockout port, forming a portion of the outer surface of the assembly box sidewall, as a recessed segment thereof. As preferably embodied, the knockout panel is attached to the assembly structure only at its front and back ends, advantageously, by two frangible webs connecting the front end and back end of the panel to, respectively, an inside surface of the sidewall adjacent the port and the edge of the backwall bordering the knockout port. Two elongated narrow slits are thereby generated between the two remaining side edges of the panel and the two front-to-back edges of the sidewall which border the knockout port.

Advantageously, the knockout panel is integrally connected to the assembly box structure by frangible webs at each end thereof to space the two ends of the knockout panel from the side-wall and the aforesaid edge of the backwall to provide knockout panel removal slot means, generally in the form of a lip spaced from the connected surface. As preferably embodied, the panel removal slot means are accessible from both the outside and the inside of the assembly box at each end of the knockout panel, and include four pairs of bearing surfaces sufficiently spaced to accommodate the tip of a wedge-like tool such as a screwdriver.

Also advantageously, the inside surface of the backwall may be provided with abutment means for extending the bearing surfaces of the removal panel removal slot means formed at the back end of the knockout panel, and, to this end, the frangible web attached thereat may be formed essentially continuous with the inside surface of the backwall.

Thus, according to the present invention, a knockout window structure may be provided wherein the knockout panel may be completely removed, to unclose the knockout port, with a simple motion of a convenient wedge-like tool such as a screwdriver, from either inside or outside the electrical assembly box.

It has been found that, by attaching the knockout panels to the electrical assembly box with frangible webs, the entire assembly — the box, panels and webs — may be integrally molded in a unitary structure from a moldable plastic material by a relatively simple and inexpensive mold. In addition, by attaching the knockout panel only at its front and back ends to, respectively, the underside of the sidewall at its back edge which borders the knockout port, and the edge of the backwall bordering the port, it has been found that access to web fracturing slot means is provided at two places on each end of the panel, i.e., from both within and without the box. Thus, the necessity for the aforesaid additional manipulations to completely remove the panel is obviated.

It has also been found that by providing an electrical assembly box with the knockout panel removal slot means according to the present invention, the knockout panel may be completely removed by inserting an appropriate tool into the panel removal slot means formed at the two ends of the panel, from either inside or outside the box, and "twisting" the tool until the web fractures. Accordingly, complete removal of the knockout panel may be achieved in two quick and simple steps with a very common tool.

It will be understood that both the foregoing general description and the following detailed description are exemplary and explanatory of the invention, but are not restrictive thereof. Accordingly, the accompanying drawings, referred to herein and constituting a part hereof, illustrate preferred embodiments of the invention, and, together with the description, serve to explain the principles of the invention.

DETAILED DESCRIPTION OF PREFERRED EMBODIMENTS

Figure 1A:
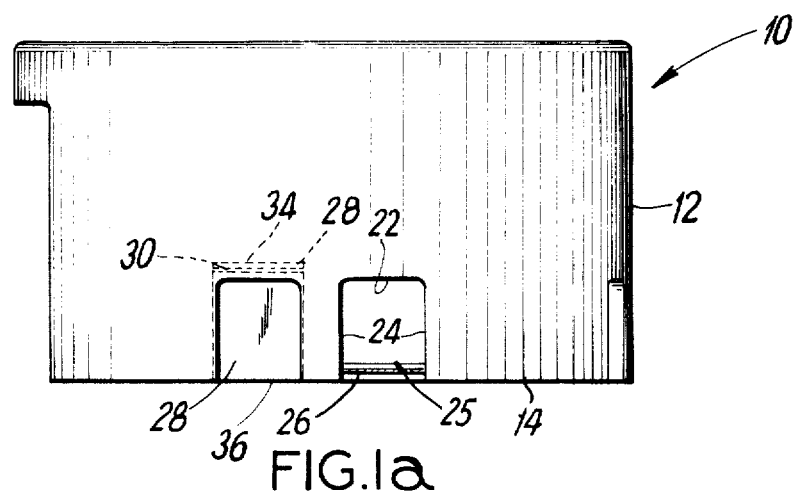
FIG. 1a is a side view of an electrical assembly box embodying the present invention.
Figure 1B:
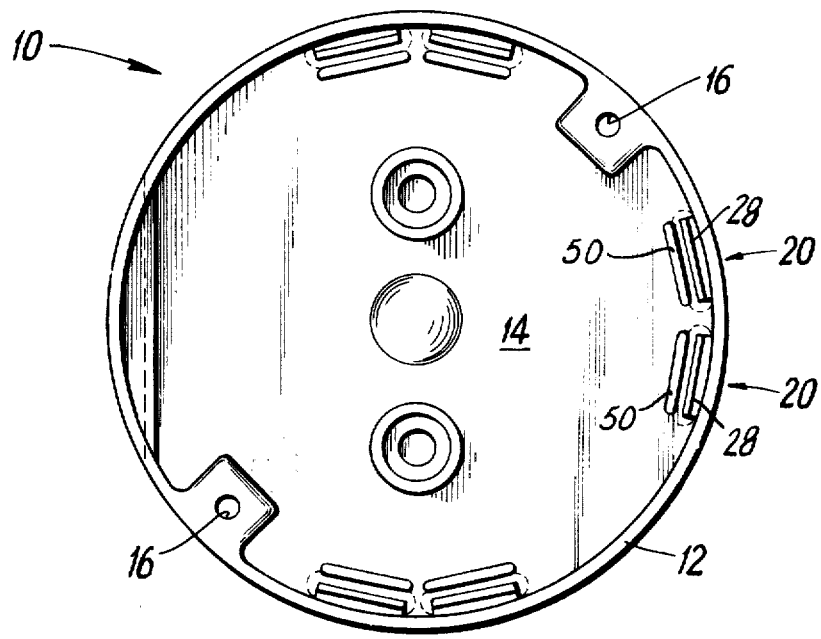
FIG. 1b is a front view of the electrical assembly box illustrated in FIG. 1a, showing the inside thereof.
Figure 1C:
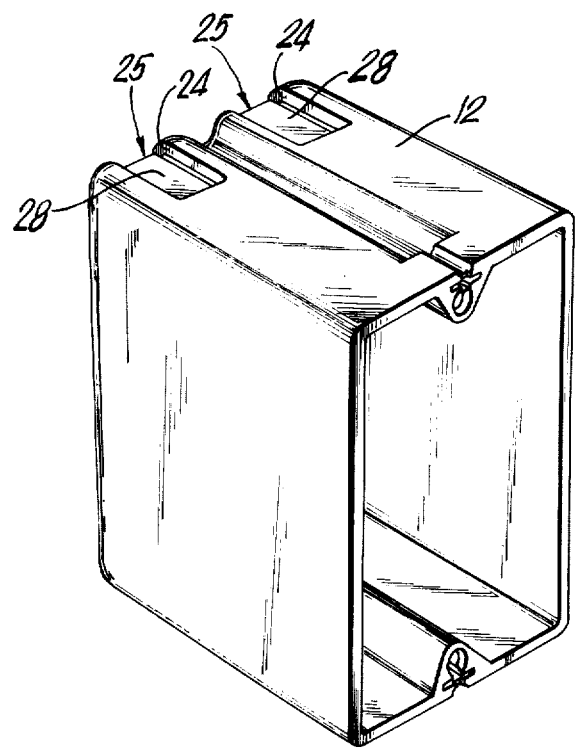
FIG. 1c is a perspective view of another electrical assembly box embodying the present invention.

Referring generally to the embodiments of the present invention illustrated in the accompanying drawings, there are shown in FIGS. 1a — 1b knockout window means according to the present invention included in an electrical assembly box which is indicated generally by reference numeral 10. Advantageously, electrical assembly box 10 is formed from a moldable plastic material and is adapted to receive and support a standard electrical outlet receptacle, switch or the like (not shown) which may be mounted thereto by means of a suitable mounting member, indicated generally by reference numeral 16. It will be understood that electrical assembly box 10 may be of any conventional shape, and that the boxes illustrated in FIGS. 1a — 1c are merely illustrative of an assembly box in which the present invention may be embodied.

Referring now to FIGS. 1a and 1b, one embodiment of knockout window means (indicated generally by reference numeral 20) is formed on electrical assembly box 10 which includes backwall 14 and upstanding continuous sidewall 12. As indicated above, knockout window means 20 according to the present invention may be provided on continuous sidewall 12 of a round electrical assembly box 10, or it may be formed on a sidewall and/or endwall of a generally rectangular electrical assembly box as shown in FIG. 1c, on a suitable wall of any assembly box.

Referring more particularly to FIG. 1a, knockout window means 20 includes knockout port 25 formed in sidewall 12, as indicated in the right-hand knockout window illustrated in FIG. 1a, and knockout panel 28, as indicated in the left-hand knockout window illustrated in FIG. 1a. Knockout port 25 is defined by or bordered by back edge 22 of sidewall 12 and side edges 24 of sidewall 12, and knockout panel 28 is formed with front edge 34, back edge 36 (which, for purposes of carrying out the present invention, as hereinafter explained, and for ease of molding, may advantageously be essentially contiguous with the plane of the outside surface of backwall 14) and two side edges (not numbered).

Figure 2C:
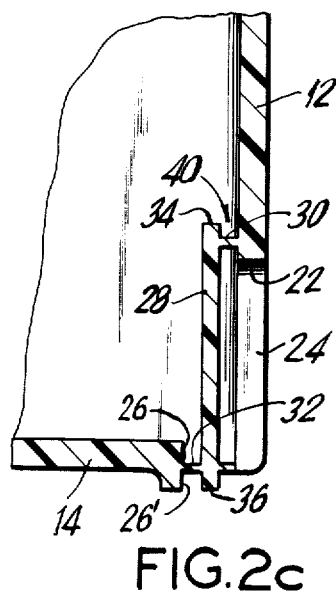
FIGS. 2a — 2c are sectional views of various embodiments of knockout window means according to the present invention.
Figure 2A:
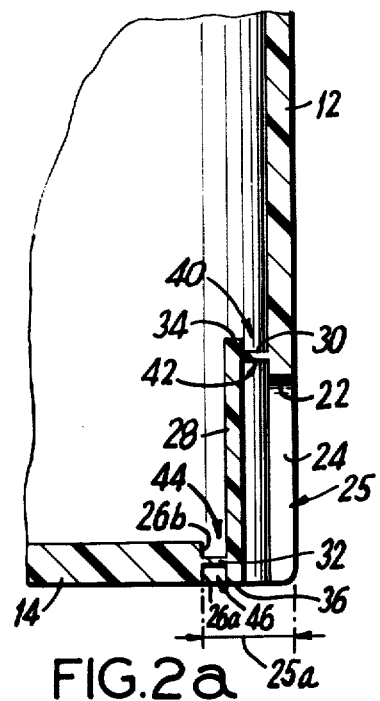

Referring now to FIG. 2a, there is shown a sectional view of one embodiment of knockout window means 20 according to the present invention. Assembly box 10 is provided with a knockout port 25 formed primarily in sidewall 12, which is thus defined by back edge 22 and side edges 24 of sidewall 12. Advantageously, the knockout port extends slightly into backwall 14, as by knockout port segment 25a formed in backwall 14 and oriented generally perpendicular to knockout port 25, to provide edge or lip 26 on backwall 14. Knockout window means 20 also includes knockout panel 28 which is, advantageously, slightly longer than the length of the knockout port from edge 22 to the outside surface of backwall 14. According to this aspect of the present invention, panel 28 is attached by first frangible web 30 slightly recessed from its front edge to the inside surface of sidewall 12 substantially near edge 22 thereof, and is also attached by second frangible web 32 slightly recessed from its back edge to lip 26 formed in backwall 14. Advantageously, first frangible web 30 is proportioned so as to be located generally central of the stagger distance between edge 22 of sidewall 12 and front edge 34 of knockout panel 28. Likewise, second frangible web 32 is proportioned so as to be attached to lip 26 of backwall 14 at a point generally central of the backwall thickness to provide two ledges, lip ledge 26a and lip ledge 26b. Lip ledge 26a is adjacent the outside surface and lip ledge 26b is adjacent the inside surface. Thus, according to this aspect of the present invention doubly accessible knockout panel removal slot means — i.e. accessible from inside and outside box 10 — are provided at each end of knockout panel 28.

Accordingly, first knockout panel removal slot 40 is formed between the outwardly facing surface of the front end (as defined generally by front edge 34) of knockout panel 28 and the inside surface of sidewall 12. Second panel removal slot 42 is formed between the inside surface of the back end of sidewall 12 adjacent the knockout port (as defined generally by back edge 22), and the outwardly facing surface of knockout panel 28. Third panel removal slot 44 is provided between the inside segment of lip 26 (i.e., lip ledge 26a, as defined by second frangible web 32) and the inwardly facing surface of knockout panel 28. Fourth panel removal slot 46 is formed between the outside segment of lip 26 (i.e., lip ledge 26b as defined by second frangible web 32) and the inwardly facing surface of the back end of knockout panel 28 (as defined generally by back edge 36 of knockout panel 28).

During installation of electrical assembly box 10, when an electrical outlet receptacle, switch, or the like, mounted therein, is to be coupled to the electrical circuitry of the room, knockout panel 28 may be removed by fracturing both frangible webs of knockout panel 28. According to the present invention, fracture of the frangible webs may be advantageously achieved by inserting a wedge-like tool, such as a screwdriver, into either of the two knockout panel removal slot means provided at each end of the panel and turned with each of the two side edges of the tool bearing against one surface of the panel removal slot means for twisting leverage such that by the application of a relatively small torque through the tool, the frangible web may be fractured. For example, the tip of a screwdriver may be inserted into slot 40 from the front and inside of assembly box 10, and twisted so as to bear against the bounding surfaces defining the slot, whereby leverage is provided for fracturing frangible web 30. The screwdriver tip may thence be inserted into slot 44, also from inside box 10, and essentially the same torque applied for fracturing frangible web 32. Accordingly, knockout panel 28 is completely removed, for unclosing the knockout port, in two extremely quick and simple steps. Likewise, from the back and outside of box 10, the screwdriver tip may instead be inserted into slot 42 and twisted as described above for fracturing frangible web 30 and thereafter into slot 46 and twisted for fracturing frangible web 32, thus effecting complete removal of knockout panel 28.

Figure 2B:
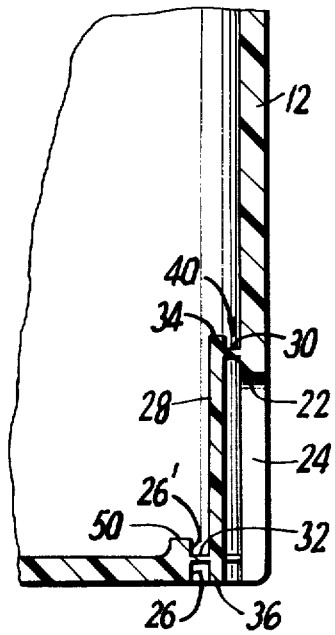

According to another aspect of the present invention, best illustrated in FIG. 2b wherein like reference numerals refer to like structures, an additonal lip surface (lip extension 26') may advantageously be provided on backwall 14. This feature is particularly advantageous for embodiments wherein backwall 14 of box 10 is relatively thin and may not provide sufficiently wide lip ledges 26a and 26b after lip, against which a panel removal tool may bear.

Advantageously, and as here preferably embodied, backwall 14 may be provided with abutment means 50 on its inside surface, which is formed with lip extension 26' forming a generally continuous surface with that of lip 26. Accordingly, second frangible web 32 may advantageously be attached to backwall 14 so as to be substantially continuous with the inside surface of backwall 14. By the inclusion of abutment means 50 on backwall 14, both slots 44 and 46 at the back end of knockout panel 28 are provided with sufficient depth for insertion of a wedge-like tool, as described above, to enable quick and complete fracture of second web 32.

It will be understood that abutment means 50 may alternatively be provided on the outside surface of backwall 14, as shown in FIG. 2c, with lip extension 26' substantially continuous with lip 26 and second frangible web 32 formed generally continuous with the outside surface of backwall 14. In this embodiment, however, the back end (as defined by edge 36) of knockout panel 28 should be slightly elongated such that it extends rearwardly to a point about as far back from the outside surface of backwall 14 as the back edge of abutment 50 for providing a complementary bearing surface bordering slot 46 to generate a slot of enlarged depth.

Figure 3A:
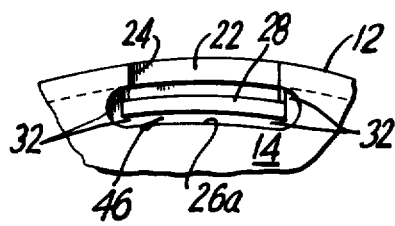
FIGS. 3a and 3b are back views of two embodiments of knockout window means illustrated in FIGS. 2a and 2b.
Figure 3B:
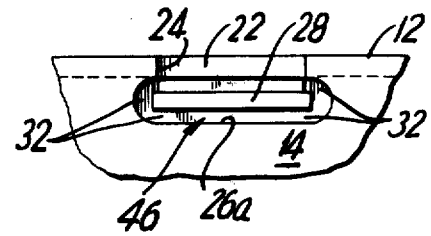

Referring now to FIGS. 3a and 3b, there is shown an embodiment of frangible web 32, which is particularly useful for enhancing the structural integrity between knockout panel 28 and backwall 14 substantially without altering the panel removal operation of the invention. According to this aspect of the invention, second frangible web 32 is formed in generally surrounding relation with the bottom surface and both side edges of panel 28. Advantageously, second frangible web 32 may be generally C-shaped for attaching the bottom surface of panel 28 and both its front-to-back edges to knockout port segment 25a formed in backwall 14.

It will be readily appreciated by those skilled in the art, that certain variations may be made in the embodiments described above without departing from the scope and spirit of the present invention as defined in the accompanying claims. For example, as illustrated in FIGS. 3a and 3b, knockout panel 28 may be formed to any convenient cross-sectional shape, such as flat or curved, in conjunction with the shape of the sidewalls of the assembly box, although it will be further understood that such shape of panel 28 is not necessarily dictated by the shape of sidewall 12 to which it is attached, since a flat knockout panel may be molded with a round-walled box.

The invention in its broader aspects is thus not limited to the specific embodiments herein shown and described, but variations may be made therefrom within the scope of the accompanying claims, without departing from the principles of the invention and without sacrificing its principal advantages.

What is claimed is:

1. In an electrical assembly box having a backwall and upstanding sidewalls defining a generally open front face at their front edges, knockout window means which comprises:
   at least one knockout port formed primarily in one of said sidewalls, said port having its front end defined by a first edge of said sidewall and its sides defined by side edges of said sidewall;
   a knockout panel for each of said knockout ports, generally superposed over said knockout ports from the inside of said sidewall, and adapted to substantially closeoff said knockout port, said panel dimensioned with its front edge extending slightly forward of said first edge of said sidewall and its back edge extending at least to a plane defined by the outside surface of said backwall, said panel being connected to said box only at its front and back ends such that knockout panel removal slot means which are accessible by a wedge-like tool from both inside and outside said box are formed at said front end and at said back end of said knockout panel.

2. Knockout window means according to claim 1, wherein said knockout port includes a port segment formed in said backwall defining a lip in said backwall for connection to said back end of said knockout panel, and which further includes:
   a first frangible web member connecting said front end of said knockout panel to the inside surface of said sidewall generally central of the distance between said first edge of said sidewall and the front edge of said knockout panel;
   a second frangible web member connecting said back end of said knockout panel to said lip formed on said backwall generally central of said lip between the inside and outside surface of said backwall, such that said panel removal slot means includes four slots, two of said slots formed at each end of said knockout panel, each of said slots defined by the pair of surfaces adjacent and essentially perpendicular to each of said frangible webs.

3. Knockout window means according to claim 2, further including a plurality of said knockout ports, said knockout panels and said pairs of said webs.

4. Knockout window means according to claim 3, wherein all of said box, said knockout panels and said webs are formed in a substantially integrally molded unitary structure from a moldable plastic material.

5. Knockout window means according to claim 1, wherein said knockout port includes a port segment formed in said backwall defining a backwall lip portion in said backwall, and which further includes: generally central of the distance between said first edge of said sidewall and the front edge of said knockout panel;

a second frangible web member connecting said back end of said knockout panel to said lip formed on said backwall generally central of said lip between the inside and outside surface of said backwall, such that said panel removal slot means includes four slots, two of said slots formed at each end of said knockout panel, each of said slots defined by the pair of surfaces adjacent and essentially perpendicular to each of said frangible webs.

6. Knockout window means according to claim 5, wherein said abutment means are formed on the inside surface of said backwall, and wherein said second frangible web is formed essentially continuous with said inside surface of said backwall, such that said two slots formed at said back end of said knockout panel are of relatively enlarged depth.

7. Knockout window means according to claim 6, wherein said second frangible web attaches said back end of said knockout panel substantially along its inwardly facing surface and both its side edges to said backwall.

8. Knockout window means according to claim 7, further including a plurality of said knockout ports, said knockout panels and said pairs of said webs.

9. Knockout window means according to claim 8, wherein all of said box, said knockout panels and said webs are formed in a substantially integrally molded unitary structure from a moldable plastic material.

10. Knockout window means according to claim 5, wherein said abutment means are formed on the outside surface of said backwall, and wherein said second frangible web is formed essentially continuous with said outside surface of said backwall and said back end of said knockout panel is slightly elongated to extend rearwardly about as far as said abutment means, such that said two slots formed at said back end of said knockout panel are of enlarged depth.

11. Knockout window means according to claim 10, wherein said second frangible web attaches said back end of said knockout panel substantially along its inwardly facing surface and both its side edges to said backwall.

12. Knockout window means according to claim 11, further including a plurality of said knockout ports, said knockout panels and said pairs of said webs.

13. Knockout window means according to claim 12, wherein all of said box, said knockout panels and said webs are formed in a substantially integrally molded unitary structure from a moldable plastic material.

* * * * *